United States Patent
Schulze et al.

(10) Patent No.: US 9,469,520 B2
(45) Date of Patent: Oct. 18, 2016

(54) DEVICE FOR PREVENTING THE INCORRECT FILLING OF A CONTAINER

(71) Applicant: REUTTER GMBH, Leutenbach (DE)

(72) Inventors: Felix Schulze, Leutenbach (DE); Kurt Wilfinger, Leutenbach (DE)

(73) Assignee: REUTTER GMBH, Leutenbach (DE)

( * ) Notice: Subject to any disclaimer, the term of this patent is extended or adjusted under 35 U.S.C. 154(b) by 0 days.

(21) Appl. No.: 14/602,538

(22) Filed: Jan. 22, 2015

(65) Prior Publication Data

US 2015/0210529 A1 Jul. 30, 2015

(30) Foreign Application Priority Data

Jan. 24, 2014 (DE) .................. 10 2014 100 805

(51) Int. Cl.
- *B67D 7/34* (2010.01)
- *B67D 7/42* (2010.01)
- *B60K 13/04* (2006.01)

(52) U.S. Cl.
CPC ............... *B67D 7/344* (2013.01); *B60K 13/04* (2013.01); *B67D 7/42* (2013.01)

(58) Field of Classification Search
CPC ......... B67D 7/42; B67D 7/344; B60K 13/04
USPC .......................................... 141/350; 220/86.2
See application file for complete search history.

(56) References Cited

U.S. PATENT DOCUMENTS

| | | | | |
|---|---|---|---|---|
| 4,195,673 A | * | 4/1980 | Johnston | B67D 7/42 141/349 |
| 7,644,723 B2 | * | 1/2010 | Zsigmond | F16K 21/185 137/172 |
| 8,235,078 B2 | * | 8/2012 | Horlacher | B60K 15/04 141/350 |
| 8,678,049 B2 | * | 3/2014 | Roys | B67D 7/344 141/1 |
| 8,800,611 B2 | * | 8/2014 | Tsiberidis | B60K 13/04 141/350 |
| 2014/0367390 A1 | * | 12/2014 | Horlacher | B60K 15/04 220/562 |

FOREIGN PATENT DOCUMENTS

| | | |
|---|---|---|
| DE | 10 2004 007 025 A1 | 9/2005 |
| DE | 20 2012 004 118 U1 | 7/2012 |
| EP | 2 687 479 A1 | 1/2014 |
| WO | 2013/092109 A1 | 6/2013 |

* cited by examiner

*Primary Examiner* — Timothy L Maust

(74) *Attorney, Agent, or Firm* — McGlew and Tuttle, P.C.

(57) ABSTRACT

A device for preventing the incorrect filling of a container includes a fuel delivery nozzle with an outlet pipe, a container filler neck, into which an end of the fuel nozzle is inserted and a permanent magnet assembly. The magnet assembly includes a first permanent magnet subassembly, with an individual magnet, on one of the outlet pipe and the filler neck and a second permanent magnet subassembly with a plurality of permanent magnets arranged in an annular pattern. The second permanent magnet subassembly is arranged on another of the outlet pipe and the filler neck whereby the first permanent magnet subassembly is arranged radially within the second permanent magnet subassembly, or vice versa, when the fuel nozzle is inserted. The second permanent magnet subassembly is arranged entirely rotatable and is oriented corresponding to the first permanent magnet subassembly when the fuel nozzle is inserted.

19 Claims, 3 Drawing Sheets

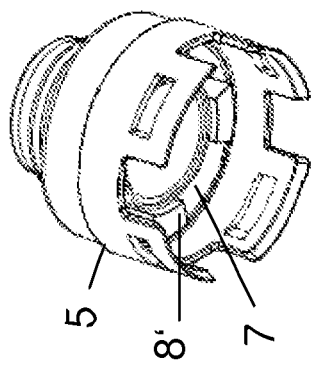
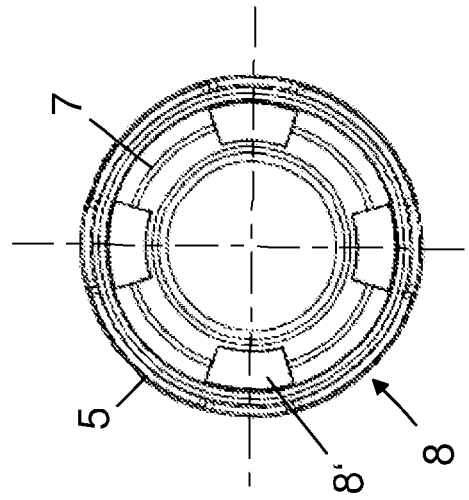
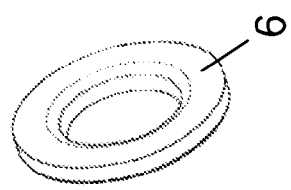
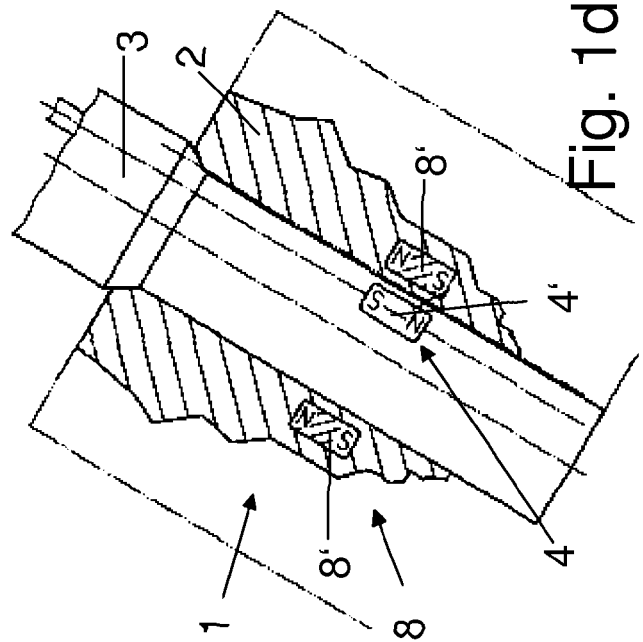
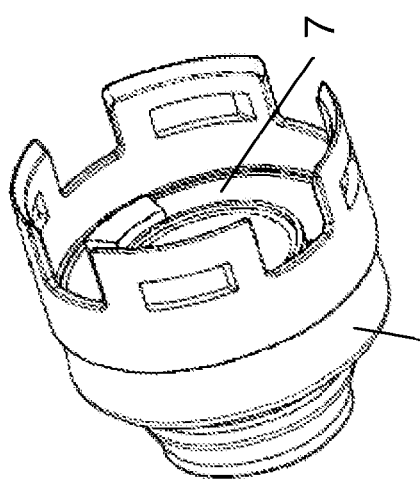
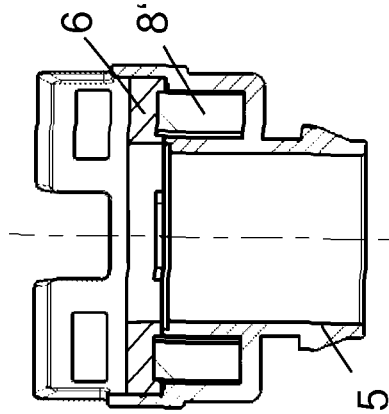

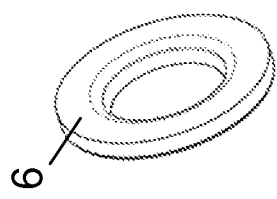
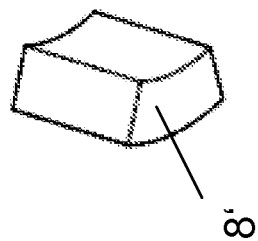
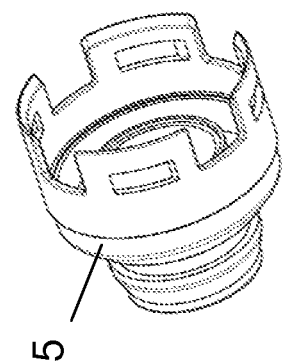
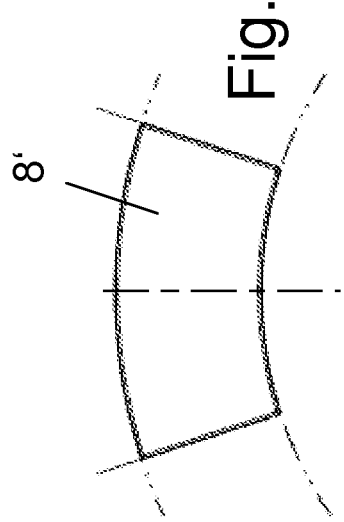
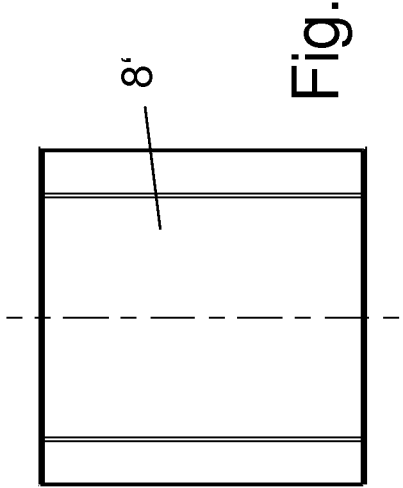

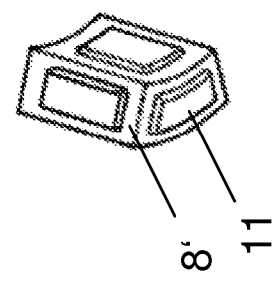
Fig. 3a
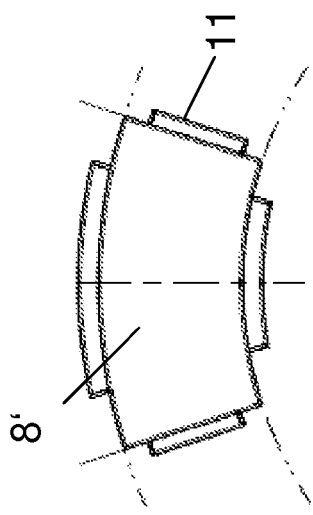
Fig. 3b
Fig. 3c
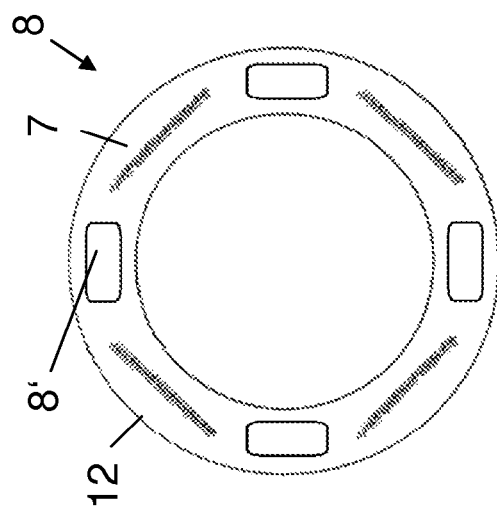
Fig. 3d
Fig. 3e
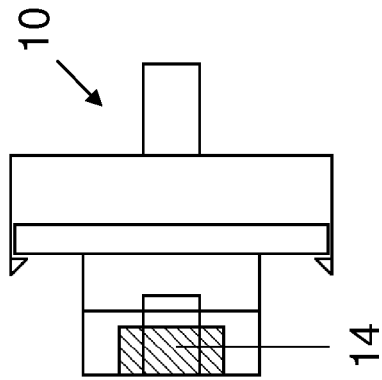
Fig. 3f

DEVICE FOR PREVENTING THE INCORRECT FILLING OF A CONTAINER

CROSS REFERENCE TO RELATED APPLICATIONS

This application claims the benefit of priority under 35 U.S.C. §119 of German Patent Application DE 10 2014 100 805.7 filed Jan. 24, 2014, the entire contents of which are incorporated herein by reference.

FIELD OF THE INVENTION

The present invention pertains to a device for preventing the incorrect filling of a container, especially for motor vehicles, for example, an AdBlue® container, with a filler neck, into which the end of a fuel nozzle can be inserted, and a permanent magnet assembly formed by a first permanent magnet subassembly in the outlet pipe of the delivery nozzle and a second permanent magnet subassembly arranged on the filler neck, and the first permanent magnet subassembly can be arranged radially within the second permanent magnet subassembly when the fuel nozzle is inserted or the first permanent magnet subassembly can be arranged radially outside the second permanent magnet subassembly when the fuel nozzle is inserted.

BACKGROUND OF THE INVENTION

AdBlue® (also called EEF, Diesel Exhaust Fluid), a urea-based liquid, is used for the exhaust gas treatment to reduce nitrogen oxides in automobile diesel engines. Since incorrect filling may occur due to an additional filler neck being provided next to the filler neck for the tank, devices for preventing the incorrect filling of the container for AdBlue® are known.

For example, a device for preventing the incorrect filling of a container of, for example, motor vehicles by means of a delivery nozzle is known from WO 2013/092109 A1, in which the device is provided with a permanent magnet assembly, which has a first permanent magnet subassembly, preferably in the form of an individual magnet in the outlet pipe of the delivery nozzle, wherein the permanent magnet assembly has an additional, second permanent magnet subassembly, which comprises either a plurality of permanent magnets arranged in an annular pattern or an individual magnet, which is arranged in the outlet pipe on the outer circumference of the outlet pipe in a radial alignment with the individual magnet of one subassembly, which said individual magnet acts as a switching magnet.

An assembly unit with a tightly seated ring magnet (NdFeB; remanence: 1.2T-1.3T; coercive field strength 800 kA/m-900 kA/m), which magnet is used to activate a switching magnet of an AdBlue® nozzle when the filler neck is inserted, is correspondingly used in a filler neck known through use.

A device for preventing the incorrect filling of a container, which has permanent magnets, which are arranged in the outlet pipe of the delivery nozzle and are not movable or are only minimally movable in their mount and which interact during the insertion of the delivery nozzle, is known from EP 2 687 479 A1.

DE 10 2004 007 025 A1 discloses a rotatable permanent magnet for indication purposes (type of fuel). The system comprises a magnet ring, which is arranged on the pump nozzle, as well as a magnetic relay and an analysis unit, which is coupled with the magnetic relay and with an optical or acoustic signal transmitter, which are arranged on the tank cap. The magnetic relays, which can close or open a circuit depending on the magnetic field of the pump nozzle, are able to distinguish diesel fuel pumps from gasoline fuel pumps in this manner. One variant can also distinguish different grades of fuel of one type, e.g., regular gasoline from premium grade gasoline. It has a plurality of magnetic relays, which are arranged at different points. When the pump nozzle is approaching the tank cap opening, the magnets in the relays become aligned and correspondingly close the circuits. It is only when the correct magnetic field code is recognized that no alarm is triggered or the closing mechanism is not activated. The magnetic sensor may be arranged here movably or rotatably in a capsule, and it becomes aligned according to the polarity of the magnet of the pump nozzle and recognizes the type of fuel.

Such devices still leave something to be desired, especially in terms of costs.

SUMMARY OF THE INVENTION

A basic object of the present invention is therefore to improve such a device, especially also in terms of the manufacturing costs.

According to the invention, a device is provided for preventing the incorrect filling of a container. The device comprises a fuel delivery nozzle comprising an outlet pipe, a container filler neck, into which an end of the fuel nozzle is inserted and a permanent magnet assembly. The permanent magnet assembly comprises a first permanent magnet subassembly comprising an individual magnet. The first permanent magnet subassembly is on one of the outlet pipe of the delivery nozzle and the container filler neck. A second permanent magnet subassembly is provided comprising a plurality of permanent magnets arranged in an annular pattern. The second permanent magnet subassembly is arranged on the other of the outlet pipe of the delivery nozzle and the container filler neck. The first permanent magnet subassembly is arranged radially within the second permanent magnet subassembly when the fuel nozzle is inserted or the first permanent magnet subassembly is arranged radially outside the second permanent magnet subassembly when the fuel nozzle is inserted. The second permanent magnet subassembly is arranged entirely rotatable. The second permanent magnet subassembly is oriented corresponding to the first permanent magnet subassembly when the fuel nozzle is inserted.

The device according to the present invention provides for a rotatable arrangement of the second permanent magnet subassembly in its entirety, so that the entire second permanent magnet subassembly becomes aligned corresponding to the first permanent magnet subassembly, which is arranged on the fuel nozzle, during the insertion of the fuel nozzle.

A first permanent magnet subassembly in the form of an individual magnet may correspondingly also be arranged at the filler neck and a second permanent magnet subassembly may be arranged on the fuel nozzle, and the entire second permanent magnet subassembly will in turn become aligned corresponding to the first permanent magnet subassembly.

Due to individual ring segments being used instead of a continuous magnetic ring, it becomes possible to save material and reduce the manufacturing costs as a result. Some weight reduction can be achieved as well.

In an especially preferred manner, the second permanent magnet subassembly comprises a plurality of individual permanent magnets, which are arranged freely movably in the circumferential direction in an annular gap. The possibility of free alignment increases the effectiveness, i.e., the closest permanent magnet of the second permanent magnet subassembly is attracted by the permanent magnet of the second permanent magnet subassembly, the permanent magnets of the second permanent magnet subassembly will become aligned correspondingly, and the two permanent magnets of both subassemblies, which said permanent magnets are positioned closest to one another, cause, supported by the optimized alignment in relation to one another, the delivery nozzle to be cleared when the fuel nozzle is positioned correctly in the filler neck.

The plurality of individual permanent magnets of the second permanent magnet subassembly is preferably arranged in the annular gap such that they are separated from one another and are located at spaced locations from one another by air gaps. It is also possible, in principle, to use spacers, but they are already kept at spaced locations from one another by the repulsive forces of adjacent permanent magnets because of the repulsed forces between the identically aligned permanent magnets of the second permanent magnet subassembly and are positioned essentially equidistantly in the annular gap. If one of the permanent magnets is moved, the others will become automatically aligned correspondingly.

The permanent magnets of the second permanent magnet subassembly preferably have the shape of ring segments, whose cross section is adapted to that of the annular gap. To avoid a possible jamming in the annular gap, the permanent magnets are preferably rounded somewhat on their edges.

Good ability of the second permanent magnet subassembly to function is achieved in case of three to eight permanent magnets designed as mutually separate permanent magnets; the number of permanent magnets especially preferably ranges from three to four.

The permanent magnets of the second permanent magnet subassembly especially preferably account, in their entirety, for between 80° and 240° of a full circle, but every individual permanent magnet has an angle range of at least 20°. This leads to good material savings along with optimal ability to function, in conjunction with a certain weight reduction.

The permanent magnets are preferably high-performance magnets made of neodymium (NdFeB; remanence: 1.27-1.3T; coercive field strength 800 kA/m-900 kA/m).

To avoid or at least absorb noises, especially during travel, the permanent magnets are preferably surrounded by absorbent material, which forms a kind of buffer and absorbs the impact of the permanent magnets on one another and/or the impact of the permanent magnets on a wall surface of the annular gap, in which the permanent magnets are arranged movably.

As an alternative or combined herewith, springs, which prevent or at least absorb impact noises of the permanent magnets, are arranged between the permanent magnets.

As an alternative, an absorbent fluid, which absorbs the impact of the permanent magnets on one another or the noises generated during their motion, may also be provided in the annular gap.

Further, the device advantageously comprises a closing cap, which is used to close the filler neck, and which contains at least one magnetizable or magnetic element, which interacts with the permanent magnets of the second permanent magnet subassembly and limits the mobility thereof when the closing cap is placed on the filler neck. Noises, which are generated by a displacement of the permanent magnet movable in the annular gap and possibly by the these permanent magnets coming into contact with one another, are avoided with certainty by the "fixation" of said permanent magnets movable in the annular gap.

The use of the device is not, of course, limited to devices for preventing an incorrect filling of an AdBlue® container, but the device according to the present invention may also be used for any other desired containers or tanks.

The present invention will be explained in more detail below on the basis of an exemplary embodiment with variants, partly with reference to the attached drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1a is a perspective exploded view of a part of the device according to the present invention according to the exemplary embodiment;

FIG. 1b is another perspective view of a part of FIG. 1a;

FIG. 1c is a top view of the part of FIG. 1a;

FIG. 1d is a schematic longitudinal section through both parts of the device according to the present invention;

FIG. 1e is a longitudinal section through the part of FIG. 1a;

FIG. 2a is a perspective view of a permanent magnet;

FIG. 2b is a top view of the permanent magnet from FIG. 2a;

FIG. 2c is a side view of the permanent magnet from FIG. 2a;

FIG. 2d is a perspective view of a magnet holder;

FIG. 2e is a perspective view of a magnet guide;

FIG. 3a is a perspective view of a permanent magnet according to a first low-noise variant;

FIG. 3b is a top view of the permanent magnet from FIG. 3a;

FIG. 3c is a top view of the permanent magnet according to a variant of the first low-noise variant;

FIG. 3d is a schematic top view of a permanent magnet assembly according to a second low-noise variant;

FIG. 3e is a schematic top view of a permanent magnet assembly according to a third low-noise variant; and FIG. 3f is a schematic cut-away view of a closing cap according to a fourth low-noise variant.

DESCRIPTION OF THE PREFERRED EMBODIMENTS

Referring to the drawings, a device 1 for preventing the incorrect filling of a container, not shown more specifically in the drawing, here of an AdBlue® container of a motor vehicle, with a filler neck 2 that can be closed by means of a closing cap 10, comprises:

a fuel nozzle 3 with a delivery nozzle, which delivery nozzle has an outlet pipe, and the container with filler neck 2, into which the end of the fuel nozzle 3 can be inserted for filling the container.

The fuel nozzle 3 has a first permanent magnet subassembly 4, which is known per se in the form of an individual magnet 4' in the outlet pipe of the delivery nozzle. The individual magnet 4' acts as a switching magnet here and is arranged on the outer circumference of the outlet pipe. According to ISO 22241-4:2009(E), the individual magnet 4' is oriented in the fuel nozzle 3 such that its north pole points in the direction of the container (cf. schematic view in FIG. 1d).

The filler neck 2 has a multipart design, and it is rigidly connected with the container in a manner known per se. It has a magnet bracket 5 with a magnet guide 6 connected therewith by means of ultrasonic welding, which form an outwardly closed annular gap 7, i.e., the annular gap is sealed against the surrounding area and especially against AdBlue®. A second permanent magnet subassembly 8 in the form of a plurality of individual permanent magnets 8', which are arranged displaceably in the circumferential direction of the annular gap 7 and interact with the first permanent magnet subassembly 4 during the insertion of the fuel nozzle 3, is arranged in the annular gap 7. The permanent magnets 8' are oriented for this axially such that their south pole points in the direction of the container and the north pole to the outside.

The permanent magnets 8' are designed as ring segments, as is shown in FIGS. 3a-c. Their dimensions in this case are: Radius 12 mm, thickness of the ring segment 5 mm, height of the ring segment 10 mm, angle range 31.5°. Four permanent magnets 8' are arranged here with a slight clearance and displaceably with the smoothest possible running within the annular gap 7, and each permanent magnet 8' occupies a partial area of 31.5° only in this case. Since the individual permanent magnets 8' are located equidistantly in the annular gap 7 because of their repulsive forces as a consequence of the identical pole orientation, a distance of about 58.5° is obtained between the individual permanent magnets 8'.

Both the individual magnet 4' and the individual permanent magnets 8' consist of NdFeB in this case.

During the use of the device 1, the fuel nozzle 3 is inserted into the filler neck 2. Due to the insertion of the fuel nozzle 3, the first permanent magnet subassembly 4 reaches approximately the level of the second permanent magnet subassembly 8, as a result of which the permanent magnet 8' located closest to the individual magnet 4' is attracted by the individual magnet 4' and becomes aligned at a corresponding point in the annular gap 7. The distance between the two magnets located closet, i.e., between the individual magnet 4' and the permanent magnet 8' located closest, decreases, and the force acting on the individual magnet 4' thus increases as well. The other three permanent magnets 8' present in this case are aligned corresponding to the permanent magnet 8' attracted by the individual magnet 4'. The individual magnet 4' is activated because of the magnetic forces of the second permanent magnet subassembly 8 in the manner known per se, and the circuit clears the delivery nozzle, so that AdBlue® can be filled into the container. A corresponding deactivation, i.e., switching off of the delivery nozzle takes place when the fuel nozzle 3 is removed.

According to a first variant, not shown in the drawings, only three permanent magnets 8' are provided instead of the four permanent magnets 8' of the exemplary embodiment. The rest of the design, also the dimensions of the annular gap and the cross section of the permanent magnet, correspond to those of the first exemplary embodiment, so that this will not be dealt with more specifically below. The three permanent magnets amount to 120° of a full circle in this case, i.e., each permanent magnet extends over an angle range of 60°. A distance of 120° is thus obtained in the annular gap between adjacent permanent magnets in case of equidistant alignment.

A second variant, likewise not shown in the drawings, provides for six permanent magnets, which are each half the size of the permanent magnets of the first variant, i.e., they extend over an angle range of 30° each, so that a distance of 60° is obtained between adjacent permanent magnets in the annular gap. The advantage of this arrangement is that in case of correct alignment of the permanent magnets used, the provision of an additional permanent magnet, for example, because of an assembly error, does not compromise the ability to function.

To avoid the generation of noise in the second permanent magnet subassembly 8, which is mounted rotatably in the filler neck 2 and comprises said plurality of permanent magnets 8' arranged in an angular pattern, the permanent magnets 8' are surrounded at least partially by absorbing material according to a first low-noise variant. The permanent magnets 8' and/or the guideways of the annular gap 7 are provided, e.g., coated or bonded, with absorbing material on all relevant surfaces in order to reduce the noise generated by mutual impacts or the impact on the wall of the guideway as much as possible. The suitable absorbing materials are elastic materials which absorb impacts due to a change in volume or local elastic deformation, for example, foam or cellular rubber, but which fully regain their original shape after the end of the action of the force at the latest.

A coating over part of the surface of the permanent magnets 8' is provided, for example, as a first low-noise variant in FIGS. 3a and 3b, in which the buffers 11 have an essentially constant thickness.

According to a variant of the first low-noise variant shown in FIG. 3c, sponge-like buffers 11 are provided on one end face of the permanent magnets 8' only, the buffers 11 being arranged on the possible contact surfaces of the permanent magnets 8' only, and it is ensured by the orientation that two buffers 11 will not come into contact with one another.

According to a second low-noise variant, which can also be combined with the first low-noise variant, springs 12 or elastic elements (e.gf., rubber buffers or springs), which prevent the permanent magnets 8' from colliding with one another and causing noise because of the collision with one another, are provided between the individual permanent magnets 8'.

As an example, four permanent magnets 8', between which four springs 12, which are shown at spaced locations from the permanent magnets 8' in the figure, are provided in FIG. 3d. Contrary to the highly schematic view, the springs may, however, also be designed such that they can always be in contact with the permanent magnets 8'. Further, it is also possible to provide more permanent magnets 8' and correspondingly more springs 12. The permanent magnets 8' may likewise have a shape corresponding to the view in FIG. 1a.

An absorbing fluid 13 is provided in the annular gap 7 as a third low-noise variant. A lubricant (e.g., oil or grease), which allows the permanent magnets 8' to have good mobility but prevents an impact with the guideway or with adjacent permanent magnets 8' or decelerates the motion shortly before the impact to such an extent that the collision will hardly generate any noise, is located between the individual permanent magnets 8' and especially between permanent magnets 8' and the guideway of the annular gap 7 according to this variant. The view in FIG. 3a is highly schematic in this case as well, i.e., the individual permanent magnets 8' may have, for example, the shape of the permanent magnets 8' from FIG. 1a.

According to a fourth low-noise variant, at least one magnetic or magnetizable element, in this case a magnetic body 14, is provided in the closing cap 10 in order to ensure that the permanent magnets 8' will not move during travel, during which the closing cap 10 is normally placed on the filler neck 2. To prevent noise from being generated by the motion of the individual segments, metallic elements are inserted into the closing cap 10 of the filler neck 2. The action of the force originating from the segments is so strong that, when firmly tightened with the tank cap screwed on, they cannot move.

While specific embodiments of the invention have been shown and described in detail to illustrate the application of the principles of the invention, it will be understood that the invention may be embodied otherwise without departing from such principles.

APPENDIX

List of Reference Numbers

1 Device
2 Filler neck
3 Fuel nozzle
4 First permanent magnet subassembly
4' Individual magnet
5 Magnet holder
6 Magnet guide
7 Annular gap
8 Second permanent magnet subassembly
8' Permanent magnet
10 Closing cap
11 Buffer
12 Springs
13 Absorbing fluid
14 Magnetic body

What is claimed is:

1. A device for preventing the incorrect filling of a container, the device comprising:
   a fuel delivery nozzle comprising an outlet pipe;
   a container filler neck, into which an end of the fuel delivery nozzle is inserted; and
   a permanent magnet assembly comprising:
      a first permanent magnet subassembly comprising an individual magnet, the first permanent magnet subassembly being on one of the outlet pipe of the fuel delivery nozzle and the container filler neck;
      a second permanent magnet subassembly comprising a plurality of permanent magnets arranged in an annular pattern, the second permanent magnet subassembly being arranged on another of the outlet pipe of the fuel delivery nozzle and the container filler neck, whereby the first permanent magnet subassembly is arranged radially within the second permanent magnet subassembly when the fuel delivery nozzle is inserted or the first permanent magnet subassembly is arranged radially outside the second permanent magnet subassembly when the fuel delivery nozzle is inserted, wherein:
   the second permanent magnet subassembly is arranged entirely rotatable;
   the second permanent magnet subassembly is oriented corresponding to the first permanent magnet subassembly when the fuel delivery nozzle is inserted;
   the plurality of permanent magnets of the second permanent magnet subassembly comprising a plurality of individual permanent magnets, which are arranged freely movable independently from each other in the circumferential direction in an annular gap of the other of the outlet pipe of the fuel delivery nozzle and the container filler neck.

2. A device in accordance with claim 1, wherein the plurality of individual permanent magnets of the second permanent magnet subassembly are arranged separated from one another and are located at spaced locations from one another, spaced apart by air gaps.

3. A device in accordance with claim 1, wherein the permanent magnets of the second permanent magnet subassembly have the shape of ring segments.

4. A device in accordance with claim 1, wherein the second permanent magnet subassembly is comprised of three to eight permanent magnets formed separately from one another.

5. A device in accordance with claim 4, wherein the second permanent magnet subassembly is comprised of three to four permanent magnets.

6. A device in accordance with claim 1, wherein the permanent magnets of the second permanent magnet subassembly occupy, in an entirety, 80°-240° of a full circle, wherein each individual permanent magnet has an angle range of at least 20°.

7. A device in accordance with claim 6, wherein the permanent magnets of the second permanent magnet subassembly occupy 100°–200° of a full circle.

8. A device in accordance with claim 1, wherein the permanent magnets of the second permanent magnet subassembly are high-performance NdFeB magnets.

9. A device in accordance with claim 2, wherein the permanent magnets of the second permanent magnet subassembly are surrounded at least partially by absorbing material, which forms a buffer between the individual permanent magnets and/or wall surfaces of the annular gap.

10. A device in accordance with claim 9, wherein the permanent magnets are provided with absorbing material on at least one of the two lateral surfaces, which can come into contact with the two adjacent permanent magnets.

11. A device in accordance with claim 1, wherein:
   the annular gap has sliding surfaces for movement of the plurality of individual permanent magnets of the second permanent magnet subassembly;
   the sliding surfaces of the annular gap are provided with absorbing material.

12. A device in accordance with claim 9, further comprising springs arranged between the permanent magnets of the second permanent magnet subassembly.

13. A device in accordance with claim 9, wherein an absorbing fluid is provided in the annular gap.

14. A device in accordance with claim 1, further comprising
   a closing cap to close the filler neck comprising a magnetizable or magnetic element, which interacts with the permanent magnets of the second permanent magnet subassembly when the closing cap has been placed on the filler neck and limits the mobility of said permanent magnets.

15. A fluid container filling arrangement comprising:
   a fuel delivery nozzle comprising an outlet pipe;
   a container filler neck, into which an end of the fuel delivery nozzle is inserted; and
   a permanent magnet assembly comprising:
      a first permanent magnet subassembly comprising an individual magnet, the first permanent magnet subassembly being on one of the outlet pipe of the fuel delivery nozzle and the container filler neck;
      a second permanent magnet subassembly comprising a plurality of permanent magnets arranged in an annular pattern, the second permanent magnet subassembly being arranged on another of the outlet pipe of the fuel delivery nozzle and the container filler neck, whereby the first permanent magnet subassembly is arranged radially within the second permanent magnet subassembly when the fuel delivery nozzle is inserted or the first permanent magnet subassembly is arranged radially outside the second permanent magnet subassembly when the fuel delivery nozzle is inserted, wherein:

the second permanent magnet subassembly is disposed in an axial position corresponding to an axial position of the first permanent magnet subassembly when the fuel delivery nozzle is fully inserted into the container filler neck; and the second permanent magnet subassembly is mounted to the other of the outlet pipe of the fuel delivery nozzle and the container filler neck so as to be freely rotatable in a circumferential direction to align the entire second permanent magnet subassembly with the first permanent magnet subassembly when the fuel delivery nozzle is fully inserted into the container filler neck.

16. A fluid container filling arrangement in accordance with claim 15, wherein the second permanent magnet subassembly comprises a plurality of individual permanent magnets, which are arranged freely movably in the circumferential direction in an annular gap of the container filler neck.

17. A fluid container filling arrangement in accordance with claim 15, further comprising
a closing cap to close the filler neck comprising a magnetizable or magnetic element, which interacts with the permanent magnets of the second permanent magnet subassembly when the closing cap has been placed on the filler neck and limits the mobility of said permanent magnets.

18. A fluid container filling arrangement comprising:
a delivery nozzle including an outlet pipe;
a container filler neck adapted to receive said delivery nozzle;
a first magnet assembly comprising an individual magnet, said first magnet assembly being arranged on one of said outlet pipe of said delivery nozzle and said container filler neck;
a second magnet assembly comprising a plurality of permanent magnets arranged in an annular pattern, said second magnet assembly being rotatably arranged on another of said outlet pipe of said delivery nozzle and said container filler neck when said delivery nozzle is inserted into said container filler neck, said first permanent magnet assembly being arranged one of radially within said second magnet assembly when said delivery nozzle is inserted into said container filler neck, and said first magnet assembly being arranged radially outside said second magnet assembly when the delivery nozzle is inserted into said container filler neck, said second magnet assembly being rotatably movable with respect to said other of said outlet pipe of said delivery nozzle and said container filler neck to align with said first magnet assembly when the delivery nozzle is inserted into said container filler neck, each of said plurality of permanent magnets of said second magnet assembly being movably mounted with respect to each other and with respect to said other of said outlet pipe of said delivery nozzle and said container filler neck when the delivery nozzle is inserted into said container filler neck.

19. A fluid container filling arrangement comprising:
a delivery nozzle including an outlet pipe;
a container filler neck adapted to receive said delivery nozzle;
a first magnet assembly comprising an individual magnet, said first magnet assembly being arranged on one of said outlet pipe of said delivery nozzle and said container filler neck;
a second magnet assembly comprising a plurality of permanent magnets arranged in an annular pattern, said second magnet assembly being rotatably arranged on another of said outlet pipe of said delivery nozzle and said container filler neck when said delivery nozzle is inserted into said container filler neck, said first permanent magnet assembly being arranged one of radially within said second magnet assembly when said delivery nozzle is inserted into said container filler neck, and said first magnet assembly being arranged radially outside said second magnet assembly when the delivery nozzle is inserted into said container filler neck, each of said plurality of permanent magnets of said second magnet assembly being movably mounted with respect to each other under magnetic biasing force from each other.

* * * * *